W. C. COMMONS.
MOVABLE SINE BAR.
APPLICATION FILED FEB. 17, 1915.
1,169,928.
Patented Feb. 1, 1916.
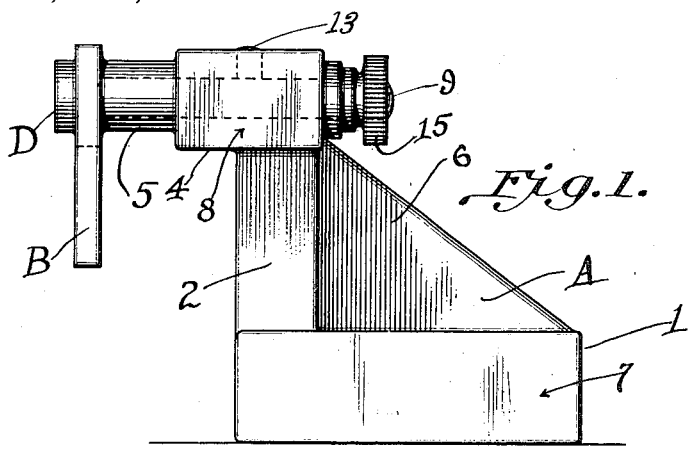
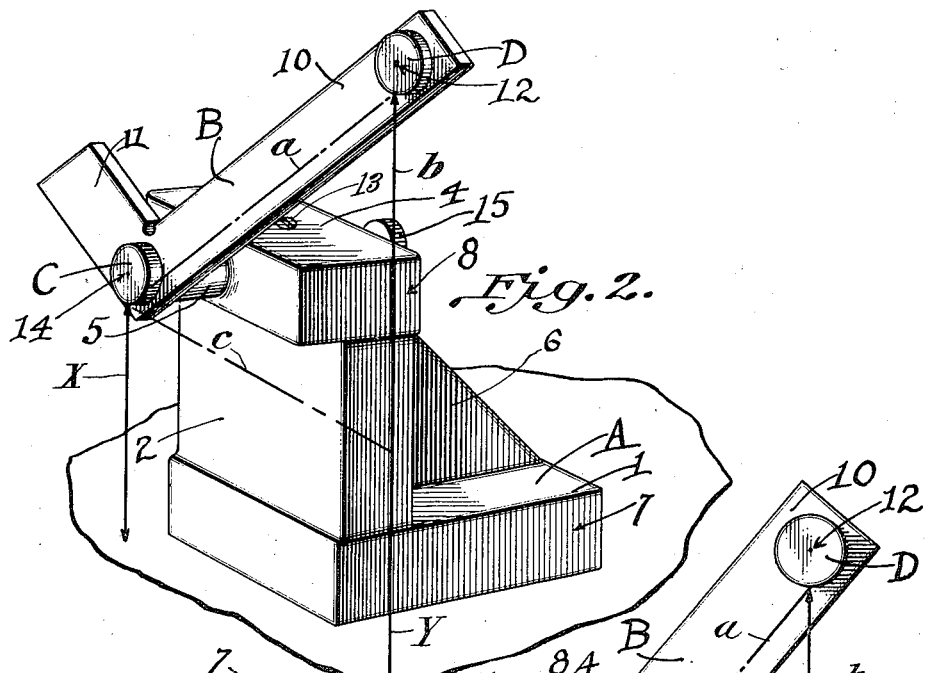
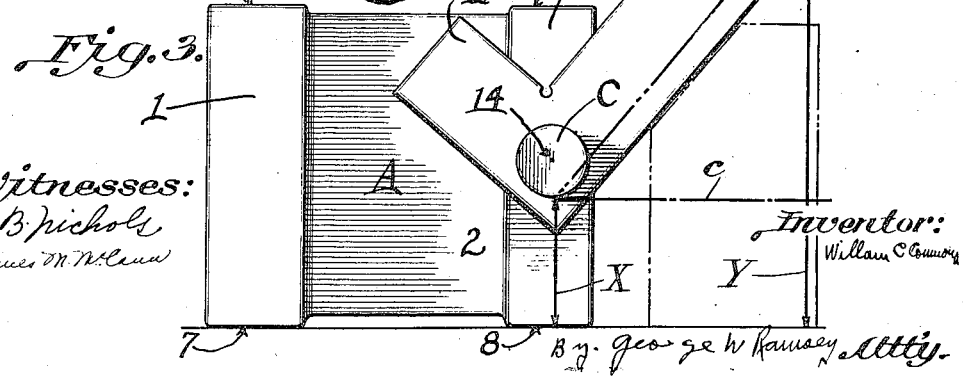
Witnesses:
M. B. Nichols
Frances M. McCann
Inventor:
William C. Commons
By George W. Ramsey, Atty.

UNITED STATES PATENT OFFICE.

WILLIAM C. COMMONS, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

MOVABLE SINE-BAR.

1,169,928.   Specification of Letters Patent.   Patented Feb. 1, 1916.

Application filed February 17, 1915.   Serial No. 8,958.

*To all whom it may concern:*

Be it known that I, WILLIAM C. COMMONS, a citizen of the United States, and a resident of the city of Woonsocket, in the county of Providence, State of Rhode Island, have invented new and useful Improvements in Movable Sine-Bars, of which the following is a specification.

This invention relates broadly to tools and more specifically to precise tools for accurately measuring angles or the inclination of angular surfaces.

The principal object of this invention is to produce a precise instrument of such construction as to accurately measure angles or the inclination of angular surfaces by means of a pivoted bar of predetermined length with the axis of the pivot located a predetermined distance above a definite horizontal plane.

A further object of this invention is to produce a device in the nature of a precise instrument having a pivoted bar with a plurality of predetermined measuring surfaces constructed thereon, said bar being adapted to be adjusted to predetermined positions relative to plane areas formed on a supporting base carrying the said bar.

Still other and further objects of this invention will in part be obvious and will in part be pointed out in the specification hereinafter following by reference to the accompanying drawings in which like characters are used to represent like parts throughout the several figures thereof.

Figure 1 is a side elevational view looking directly at the end of the short arm with the axis of the short arm vertical and the axis of the long arm horizontal, and showing particularly a direct side elevational view of the supporting block. Fig. 2 is a perspective view showing the measuring bar set at an inclination to the horizontal and the supporting block resting directly on the base thereof. Fig. 3 is a front view showing the measuring bar at an inclination to the horizontal and the supporting block resting on its side, and more particularly on the pads comprising extensions of the base and the shelf of the supporting block.

The usual method of measuring angles in connection with machine tool work has been to use various types of protractors or graduated bevel edges, or in extreme accurate work to use a height gage and measure between fixed points on the said angular surface, then by mathematical calculation to determine the inclination of the said surface relative to some predetermined plane. This latter method is accurate where it can be used, but in many, and in fact in most cases it is not a practical method.

The present invention, which will hereinafter be more specifically described by referring to the drawings, consists primarily in an accurately formed pivoted measuring bar carrying buttons having true cylindrical surfaces of exactly the same diameter. The centers of these buttons are a predetermined fixed distance apart, and the center of one button lies within the axis about which the measuring bar is pivotally supported. The edges of the long arm of the measuring bar lie in surfaces parallel to a line joining the centers of the buttons, and the edges of the short arm of the bar lie in planes at right angles to the line joining the centers of the buttons. By this construction it will be noted that the distance between the lines where vertical planes, passing through the centers of the buttons intersect the cylindrical surfaces, will always be exactly the same distance as the distance between the centers of the buttons, irrespective of the inclination of the measuring arm.

By use of this tool it will be seen that the exact value of an angle relative to a predetermined horizontal plane may be accurately determined by measuring the vertical distance that the lower edge of the button at the free end of the arm stands above the lower edge of the button whose center is the axis on which the arm revolves; since the distance between these two points constitutes the hypotenuse of a right triangle, which hypotenuse is always a very accurately predetermined fixed dimension. In practice it is convenient to make this dimension either 10, a factor of 10, or a multiple of 10, so that the computations become automatic by consulting a table of natural sines. As it is not always convenient or possible to utilize a long bar in measuring angular surfaces on a particular article, the measuring bar may be provided with a short arm extend at right angles to the long arm, carrying the measuring buttons, so that the short arm will measure an angle which is the complement of the angle measured by the long arm. It is also preferable to form the ends of the arms accurately at right angles to the axis of each arm, so that the ends of the arms may be conveniently used to measure such angles as could not be ascertained by longer measuring surfaces.

Referring now to the drawings the particular device herein disclosed includes a supporting block A, the lower member of which comprises a base 1 that carries a vertical web 2 on the upper part of which web is formed a shelf 4 from which extends a boss 5. In order to provide rigidity a bracket web 6 extends between the base member 1 and the vertical web 2 at substantially the mid-portions in each of these webs. The lower part of the base member 1 is accurately formed to comprise a surface extending substantially parallel to the axis of the boss 5. The ends of the base 1, also the shelf 4, extend slightly beyond the ends of the web 2 to constitute pads 7 and 8, respectively, which pads are formed to lie in planes at right angles to the plane on the bottom of the base 1, and parallel to the axis of the boss 5. The boss 5 is provided with a bearing for a through bolt 9 that is adapted to constitute a pivot which supports a measuring bar B. The measuring bar B in the present case is formed with two arms 10 and 11, the axes of which are at right angles to each other and intersect the axis of the pivot bolt. The sides of the measuring bar are accurately formed to lie in planes respectively parallel to the axis of each arm, and the ends of each arm of the measuring bar lie in planes parallel to the axis of the other arm. The pivot bolt 9 is very accurately and carefully secured in the supporting member and passes through an opening accurately formed in the measuring bar in such manner that the axis of the bolt, as has been specified, is intersected by the axis of each arm of the measuring bar. The head of the pivot bolt 9 is very carefully formed into a short section of a true cylinder and constitutes a button C, the exact center of which is the axis of the supporting bolt 9. At the outer end of the long arm 10 of the measuring bar A is mounted another button D also comprising a short section of a true cylinder, the diameter of which is identically the same as the diameter of the head of the supporting bolt, and the exact center 12 of the outer button or cylinder D is a fixed predetermined distance from the axis of the supporting bolt, i. e. the exact center 14 of the button C. The end of the supporting bolt 9 opposite to the head thereof is provided with a thumb clamp nut 15, which constitutes a means to secure the measuring bar in any predetermined angular position. Preferably the construction includes an arrangement for preventing the rotation of the supporting bolt 9 relative to the base 1 and for this purpose a short stub screw 13 is provided.

In using this device to test an angle the edge of one of the measuring arms, for example the lower edge of the long arm 10, is set at the inclination of the desired angle to be measured, or it may be placed in contact with an angular surface on a particular article. The distance Y, (Fig. 2), between the lower edge of the button D and a surface plate is then accurately measured with a height gage, and since the distance X, between the lower portion of the button C and the surface plate is fixed and known, the sine of the angle $a$—$c$ may be accurately determined because the hypotenuse $a$ is known and the side $b$ has been determined by measurement. Where the distance between the centers 12 and 14 is ten, the measurement of the side $b$ of the triangle is exactly in accordance with a table of natural sines. Where the distance between the centers 12 and 14 is five, the sine of the angle is quickly determined by dividing the measurement of the side $b$ by two. The quotient will numerically correspond to the natural sine of the angle. This method, it will be noted, gives a very accurate determination of angles, either in using the tool to ascertain the angle of inclination of an angular surface or in using the device as a test tool for accurately determining angles to which a predetermined surface is to be formed.

As it is physically possible to vary the specific construction herein illustrated and described without departing from the spirit of my invention, I desire it to be understood that the particular device herein shown is to be understood as illustrative and not to be taken in the limiting sense.

Having thus described my invention what I desire to claim is:—

1. In a device of the character described in combination, a supporting member, a measuring bar pivotally mounted upon said supporting member, a pair of cylindrical buttons coöperating with said measuring bar, one of said buttons having the same axis as the axis of rotation as said measuring bar, and means to support said measuring bar in predetermined positions.

2. In a device of the character described in combination, a supporting member, a measuring bar pivotally mounted upon said supporting member at one side thereof, a pair of cylindrical buttons coöperating with said measuring bar, certain of the edges of said measuring bar being parallel to the plane including the axes of said buttons, and means to support said measuring bar in predetermined adjusted positions.

3. In a device of the character described in combination, a supporting member provided with flat supporting surfaces, a boss extending outwardly from said supporting member, a measuring bar pivotally mounted upon said boss, a supporting bolt journaled in said boss, a cylindrical head formed upon said supporting bolt to constitute a button, a cylindrical button carried by the outer end of said measuring bar, both of said buttons being of the same diameter, and a thumb nut upon said bolt and operative to support said measuring bar in predetermined angular positions.

4. In a device of the character described in combination, a supporting member, a measuring bar pivoted on a horizontal axis to swing in a vertical plane, said measuring bar being provided with two arms the axes of which are at right angles to each other, a pair of cylindrical buttons, one of said buttons having an axis coincident with the axis of rotation of said measuring bar, and the other button being mounted upon said bar adjacent the end of one of said arms, the edges of the arm carrying the last mentioned button being parallel to a plane including the axes of said buttons.

5. In a device of the character described in combination, a supporting member, a measuring bar pivotally mounted upon a horizontal axis to have a rotative movement in a vertical plane, said measuring bar being provided with a long arm and a short arm, the axes of said arms meeting the axis of rotation of said bar at a right angle, a pair of cylindrical buttons, one of which is carried by said measuring bar and means to support said measuring bar in predetermined angular positions.

6. In a device of the character described in combination, a supporting member, said supporting member being provided with supporting surfaces adapted to lie in planes perpendicular one to the other, a measuring arm carried by said supporting member, said measuring arm being pivotally mounted upon a horizontal axis which is parallel to the said specified planes, a pair of cylindrical buttons comprising members to determine the base line of measurement carried by said measuring arm and means to support said measuring arm in predetermined angular positions.

7. In a device of the character described in combination, a supporting member, said supporting member being provided with surfaces lying in planes perpendicular one to the other, a measuring bar pivotally mounted upon said supporting member to rotate about an axis that is parallel to both of the specified planes, said measuring bar being provided with a long arm and a short arm, a pair of cylindrical buttons comprising means for measuring on a base line of predetermined length, said buttons being carried upon one side of said measuring bar, and means for supporting said measuring bar in definite predetermined angular positions with reference to the previously specified planes.

8. In a device of the character described in combination, a supporting member, said supporting member being provided with supporting surfaces lying in intersecting planes, a measuring bar, means operatively connecting said bar with said supporting member to render said bar adjustable to various angular positions relative to said planes, said measuring bar being provided with a long arm and a short arm, the axes of said arms meeting each other at right angles, and a pair of cylindrical buttons of the same diameter, one of said buttons being carried by said measuring bar near the outer end of said long arm and the other of said cylindrical buttons being arranged with its axis coincident with the axis of rotation of said measuring bar.

9. In a device of the class described in combination, a supporting member provided with plane surfaces adapted to determine a plane surface constituting a predetermined base for measuring, a measuring bar carried by said supporting member and capable of rotating relative to said supporting member and in a plane at right angles to the said predetermined base plane, a pair of cylindrical buttons arranged relative to said measuring bar and adapted for the determination of the base line of predetermined length, one of said buttons being located near the outer extremity of said measuring bar and the other of said buttons being located with its axis coincident with the axis of rotation of said bar.

10. In a device of the class described in combination, a supporting base being provided with a plane surface for determining a predetermined plane comprising a base for measurements, a measuring arm mounted upon said supporting member to rotate upon an axis parallel to the said predetermined plane, a pair of cylindrical buttons both of which are fixedly mounted relative to said measuring arm and one of which rotates with said measuring arm, said cylindrical buttons being of exactly the same diameter and comprising means for determining a predetermined base line.

WILLIAM C. COMMONS.

Witnesses:
 Roy J. Souler,
 Austin M. Wilson.